United States Patent [19]

Mutschler

[11] Patent Number: 5,609,138
[45] Date of Patent: Mar. 11, 1997

[54] PRESSURE REGULATING DEVICE FOR A FUEL DELIVERY SYSTEM

[75] Inventor: Jan Mutschler, Alcala De Henares, Spain

[73] Assignee: Robert Bosch GmbH, Stuttgart, Germany

[21] Appl. No.: 664,585

[22] Filed: Jun. 17, 1996

[30] Foreign Application Priority Data

Jun. 17, 1995 [DE] Germany ..................... 195 22 042.0

[51] Int. Cl.$^6$ ................................................. F02M 37/04
[52] U.S. Cl. ........................ 123/463; 123/456; 137/510
[58] Field of Search ............................... 123/463, 468, 123/469, 456, 470, 472, 447; 137/510

[56] References Cited

U.S. PATENT DOCUMENTS

| | | | |
|---|---|---|---|
| 4,559,968 | 12/1985 | Strohl | 137/510 |
| 4,741,315 | 5/1988 | Fehrenbach et al. | |
| 4,742,845 | 5/1988 | Copoccia | 137/510 |
| 4,903,667 | 2/1990 | Sonnenmoser | |
| 4,903,721 | 2/1990 | Maier | 123/463 |
| 5,012,784 | 5/1991 | Fehrenbach | |
| 5,056,725 | 11/1991 | Spoetter | 123/456 |
| 5,076,320 | 12/1991 | Robinson | 123/463 |
| 5,152,269 | 10/1992 | Murphy | 123/456 |
| 5,213,126 | 5/1993 | Ono | 137/510 |
| 5,279,327 | 1/1994 | Ahsobrooks | 137/510 |
| 5,394,900 | 3/1995 | Okuyama | 137/510 |
| 5,533,478 | 7/1996 | Robinson | 123/456 |

FOREIGN PATENT DOCUMENTS

| | | |
|---|---|---|
| 3607811 | 9/1987 | Germany . |
| 2248273 | 4/1992 | United Kingdom . |
| 2248274 | 4/1992 | United Kingdom . |

*Primary Examiner*—Carl S. Miller
*Attorney, Agent, or Firm*—Edwin E. Greigg; Ronald E. Greigg

[57] ABSTRACT

A fuel regulating device which is fastened with a connecting fitting to a fuel housing. When the pressure regulating valve is installed on the fuel housing, the connecting fitting fits in a connecting piece provided on the fuel housing. The pressure regulating valve includes a valve housing and a connecting fitting which can be pivoted in relation to the valve housing. Because of the pivot bearing between the connecting fitting and the valve housing, considerable dimensional tolerances can be compensated for, which essentially reduces manufacture costs. The pressure regulating device is particularly suited for fuel delivery systems of vehicles with an internal combustion engine.

30 Claims, 3 Drawing Sheets

PRESSURE REGULATING DEVICE FOR A FUEL DELIVERY SYSTEM

BACKGROUND OF THE INVENTION

The invention is based upon a pressure regulating device for fuel delivery systems of internal combustion engines. There is a pressure regulating device with a pressure regulating valve connected to a fuel housing. The pressure regulating valve has a valve housing and a connecting fitting. The valve housing of the pressure regulating valve is fixed to the fuel housing. The connecting fitting is connected to a connecting piece which is connected to the fuel housing. When the pressure regulating device is assembled by means of installing the pressure regulating valve on the fuel housing, the connecting fitting must be connected to the connecting piece. If this connection is to be properly produced, very narrow measurement tolerances must be maintained in the pressure regulating valve and in the fuel housing. With the known pressure regulating device, these tolerance requirements make the production cost undesirably high.

OBJECT AND SUMMARY OF THE INVENTION

The pressure regulating device has an advantage over the prior art that it allows a reasonably priced production of the pressure regulating valve and the fuel housing and furthermore advantageously allows simple, rapid, and trouble-free installation of the pressure regulating valve on the fuel housing. In particular, a lateral offset can be compensated for to a large extent; this offset can hardly be prevented in the fuel housing between the connecting piece to which the connecting fitting is connected and the stop position at which the valve housing is stopped.

Advantageous updates and improvements of the pressure regulating device disclosed herein are possible by means of the measures embodied hereinafter.

It is particularly advantageous to embody the pivot bearing so that the connecting fitting can pivot spatially in a plurality of planes in relation to the valve housing, which assures simple, trouble-free installation of the pressure regulating valve on the fuel housing under all circumstances.

The preferred embodiment with the ball zone on the connecting fitting and the ball socket on the valve housing of the pressure regulating valve advantageously provides a simple and reasonably priced realization of the pivot bearing.

The initial stress between the ball socket and the ball zone essentially simplifies the installation of the pressure regulating valve on the fuel housing in an advantageous manner. As a result, the securing of the connecting fitting in the valve housing can be advantageously achieved without further expenditure.

The embodiment of the ball socket on a part of the valve housing has the advantage that the manufacture of the pressure regulating valve requires a minimum of component parts.

In addition, the insertion aid, which is preferably realized by means of an entry bevel on the fitting end of the connecting fitting oriented toward the connecting piece or by means of an entry bevel on the connecting end of the connecting piece oriented toward the connecting fitting, advantageously makes the installation of the pressure regulating valve on the fuel housing easier.

With the centering aid, preferably realized by means of a circumferential retaining lip, which is provided on the valve housing and is elastic in the radial direction, the advantage is achieved that before and during the installation of the pressure regulating valve on the fuel housing, the connecting fitting is disposed in a favorable position in relation to the valve housing. This makes the installation substantially easier. In most instances, the favorable position is the one in which the connecting fitting is aligned centrally in relation to the valve housing.

The invention will be better understood and further objects and advantages thereof will become more apparent from the ensuing detailed description of preferred embodiments taken in conjunction with the drawings.

DESCRIPTION OF THE PREFERRED EMBODIMENTS

The pressure regulating device according to the invention can be used in various internal combustion engines in which, in fuel supply, a pressure of the fuel is intended to be regulated.

Figure 1:
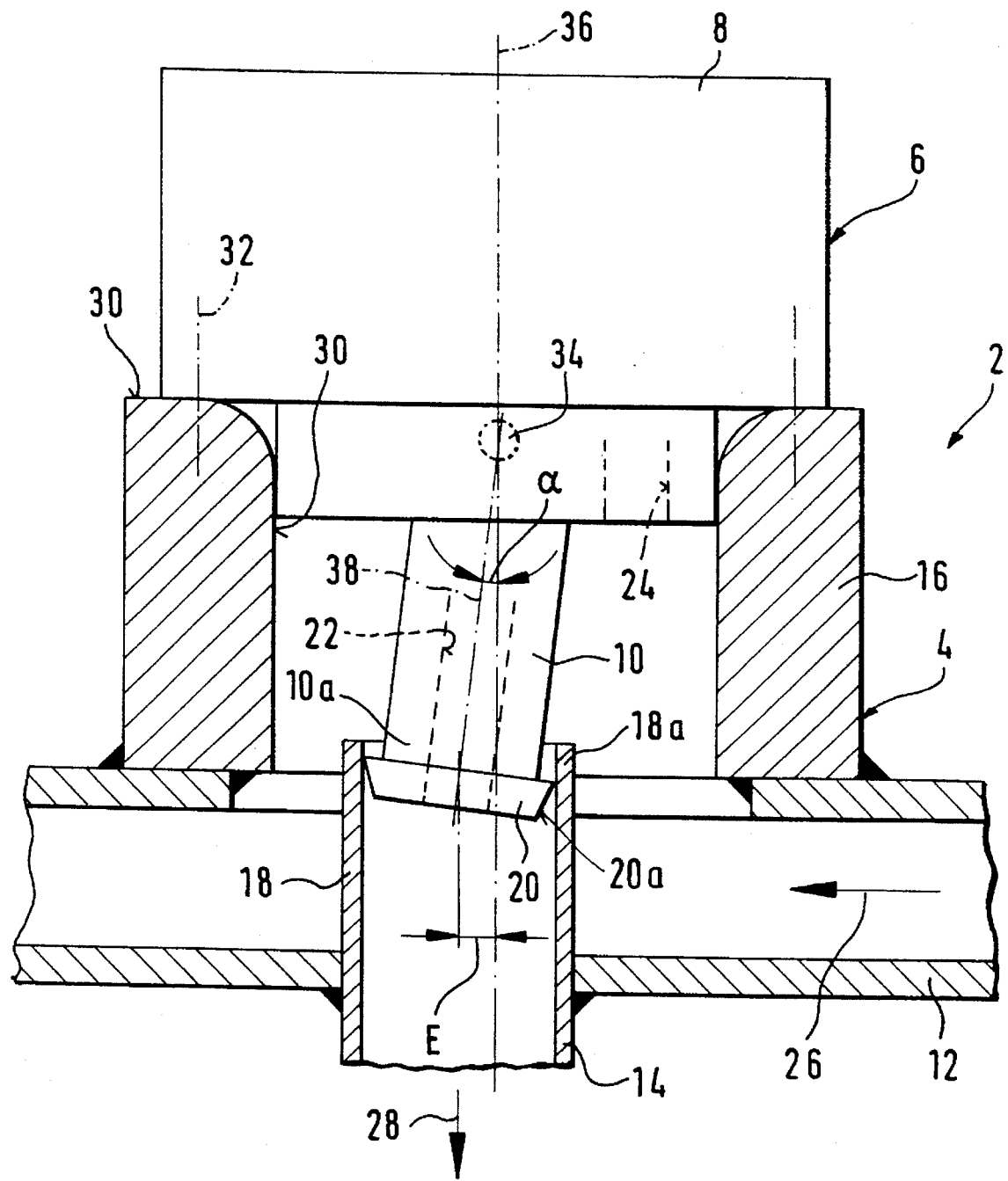
FIG. 1 shows a schematic representation of a first selected exemplary embodiment.

FIG. 1 shows a selected, advantageous exemplary embodiment. In order to be able to make the essential elements of the invention as clearly visible as possible in FIG. 1, the pressure regulating valve and the fuel housing are depicted in a very simplified manner.

FIG. 1 shows a pressure regulating device 2 with a fuel housing 4 and a pressure regulating valve 6. The fuel housing 4 is preferably a fuel distribution line to which, apart from the pressure regulating valve 6, for example a plurality of fuel injection valves are also connected, which are not shown. The pressure regulating valve 6 includes a valve housing 8 and a connecting fitting 10. The fuel housing 4 is essentially comprised of an inflow body 12 and a return body 14. The return body 14 is mechanically connected to the inflow body 12. A fitting 16 is likewise connected to the inflow body 12. The return body 14 is shaped like a tube and forms a connecting piece 18 to which the connecting fitting 10 of the pressure regulating valve 6 is connected in the assembled state. The connecting piece 18 has a connecting end 18a, which is oriented toward the connecting fitting 10, and the connecting fitting 10 has a fitting end 10a, which is inserted into the connecting piece 18. An entry bevel 20a of an insertion aid 20 is disposed on the fitting end 10a. A longitudinal bore 22 extends through the connecting fitting 10 and is indicated with dashed lines. There is an inflow opening 24 in the valve housing 8, which opening is indicated with dashed lines. The inflow body 12 and the fitting 16 are embodied as hollow, so that an inflow 26 is constituted in them, which leads to the inflow opening 24 of the pressure regulating valve 6. A return 28, which leads away from the longitudinal bore 22, is constituted inside the return body 14, which is embodied as hollow. The inflow 26 and the return 28 are each shown by means of an arrow which symbolizes the flow direction of the fuel. A fuel pump, not shown in the drawing, supplies fuel via the inflow 26 of the fuel housing 4 to the pressure regulating valve 6.

The pressure regulating valve 6 makes sure that the fuel in the inflow 26 is kept below a particular pressure. Excess fuel travels from the pressure regulating valve 6 through the longitudinal bore 22 of the return 28 and reaches a fuel receptacle not shown.

On its inner diameter and on its end face remote from the inflow body 12, the fitting 16 is embodied so that a stop position 30 is produced here, against which the valve housing 8 of the pressure regulating valve 6 is stopped. The valve housing 8 is connected to the fitting 16 of the fuel housing 4 by a fastening means 32, which is indicated by a dot-and-dash line. The fastening means 32 is for example a screw, a clamp, or the like.

With the aid of a pivot bearing 34, the connecting fitting 10 of the pressure regulating valve 6 is supported so that it can pivot in relation to the valve housing 8. In the exemplary embodiment selected for FIG. 1, the pivot bearing 34 is disposed inside the valve housing 8 and therefore cannot be seen in the representation selected. Nevertheless, for the sake of better understanding, the pivoting connection 34 in FIG. 1 is symbolically depicted by a dotted circle.

Viewed in the simplest terms, the valve housing 8 of the pressure regulating valve 6 has a stepped, cylindrical form, whose longitudinal housing axis 36 is indicated with a dot-and-dash line. The connecting fitting 10 also has a stepped, cylindrical form when viewed in the simplest terms, whose longitudinal fitting axis 38 is likewise symbolically depicted with a dot- and-dash line. As a rule, the longitudinal housing axis 36 and the longitudinal fitting axis 38 intersect in the center point of the pivot bearing 34. Because of the pivot bearing 34, the longitudinal fitting axis 38 is supported so that it can pivot in relation to the longitudinal housing axis 36 by a particular pivot angle α.

The inner diameter of the connecting end 18a is slightly greater than the outer diameter of the fitting end 10a of the connecting fitting 10. The position of the longitudinal housing axis 36 is determined by the precise dimensions of the stop position 30 and the precise dimensions of the valve housing 8 in the region of the stop position 30. Since it is hardly possible that the central axis of the connecting fitting 18 coincides exactly with the longitudinal housing axis 36 in the region of the connecting end 18a, even with the highest and most costly manufacture expenditure, the fitting end 10a of the connecting fitting 10 of the pressure regulating valve 6 is eccentrically deflected in the region of the connection with the connecting end 18a of the connecting piece 18 by a greater or lesser deflection E. The spatial alignment of the longitudinal housing axis 36 is essentially determined by the position of the bore in the fitting 16, which bore contains the valve housing 8, as well as by the spatial tolerance position of the end face of the fitting 16 to which the valve housing 8 is attached and is furthermore determined by the end face of the valve housing 8, with which the valve housing 8 rests against the fitting 16 and by the form and position of the diameter of the valve housing 8, which is guided by the fitting 16. The deflection E is essentially also determined by how far the central axis of the return body 14 diverges from the central axis of the fitting 16. Because of the deflection E, the longitudinal fitting axis 38 is pivoted in relation to the longitudinal housing axis 36 by a particular pivot angle α.

The exemplary embodiment shown in FIG. 1 is a three-dimensional embodiment and the pivot bearing 34 can be preferably embodied so that if all possible pivot angles α are considered, a circular ball is formed as the envelope for the longitudinal fitting axis 38, with the vertex in the center point of the pivot bearing 34.

The entry bevel 20a of the insertion aid 20 on the fitting end 10a is used so that when the pressure regulating valve 6 is installed on the fuel housing 4, the connecting fitting 10 is disposed without trouble in the connecting piece 18.

Depending upon the required tightness between the inflow 26 and the return 28, a seal can be provided on the fitting end 10a or on the connecting end 18a. The fitting end 10a for example can also be composed of elastic material and have a slightly larger outer diameter than the inner diameter of the connecting end 18a so that as a result, the inflow 26 is sealed in relation to the return 28 in this region.

Figure 2:
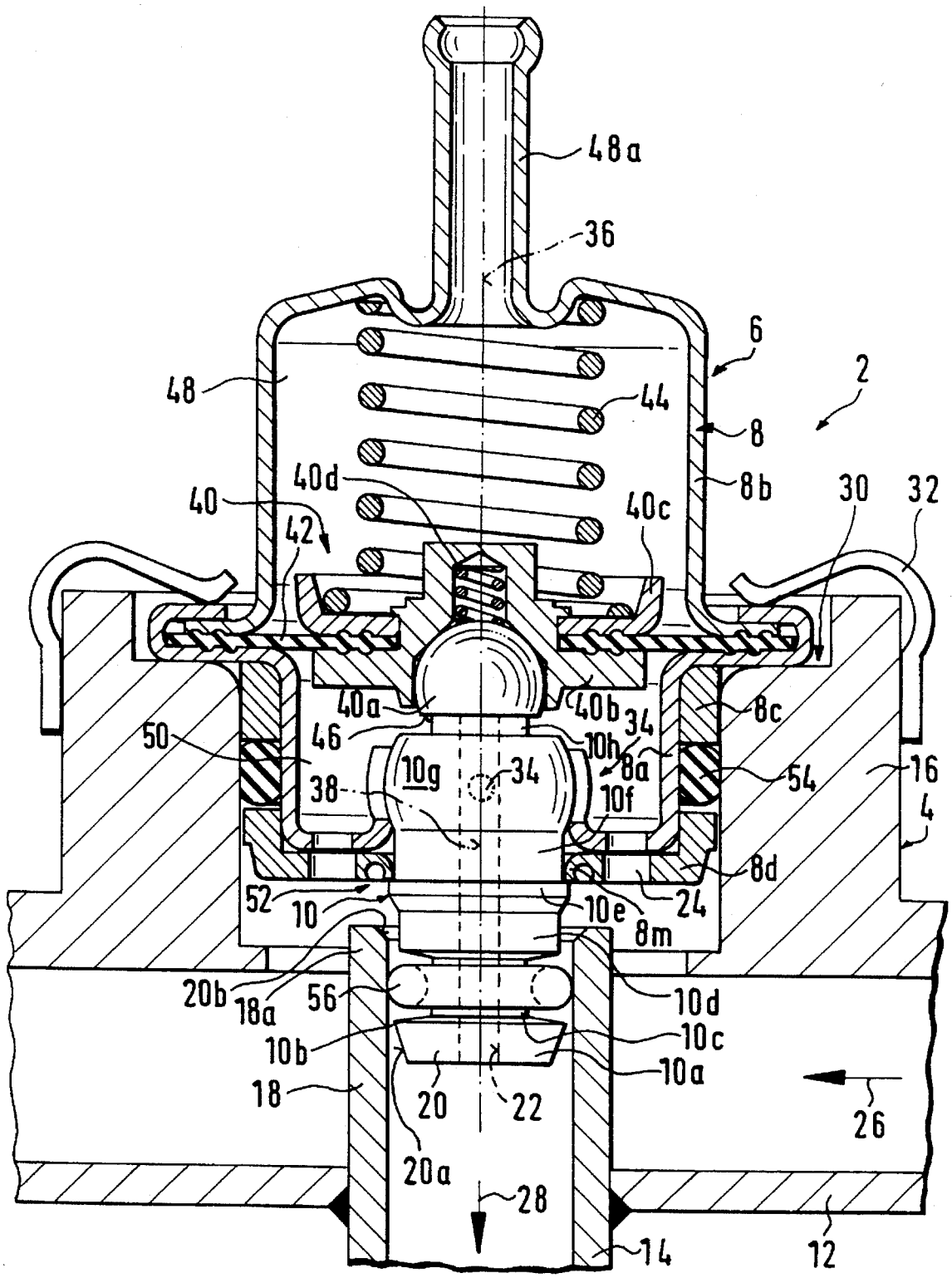
FIG. 2 shows another exemplary embodiment.

FIG. 2 shows another selected, advantageous exemplary embodiment by way of example; this exemplary embodiment is shown in such a way that in comparison to FIG. 1, additional details can be seen.

In all the drawing figures, parts which are the same or function in the same manner are given the same reference numerals. Provided that nothing to the contrary is mentioned or shown in the drawings, everything shown and mentioned in conjunction with one of the drawings is also true for the other exemplary embodiments. As long as nothing different ensues from the explanations, the details of the various exemplary embodiments can be combined with each other.

FIG. 2 shows the pressure regulating device 2 in a fundamental position in which the longitudinal housing axis 36 and the longitudinal fitting axis 38 are flush with each other. The fundamental position is a theoretical, ideal position, though, which can practically never be achieved because of the hardly avoidable lateral offset between the longitudinal housing axis 36 and the connecting piece 18. In FIG. 2, for a better overall view, the depiction of the eccentric deflection E shown in FIG. 1 is omitted. FIG. 2 is laid out so that more details of the pressure regulating valve 6 are visible than in FIG. 1.

The valve housing 8 is composed of a first part 8a and a second part 8b. The two parts 8a, 8b are so- called deep-drawn sheet metal parts and are connected to each other via a crimp. The valve housing 8 also includes a third part 8c and a fourth part 8d. The parts 8c and 8d are preferably comprised of plastic which is turned or injection-molded into shape.

Inside the valve housing 8, there is a valve member 40, a membrane 42 and a regulating spring 44. The valve member 40 includes a closing member 40a, a retainer 40b, a spring plate 40c, and a spring 40d. The retainer 40b and the spring plate 40c are joined together firmly and the membrane 42 is clamped between them. The closing body 40a has a closing face 46 oriented toward the connecting fitting 10. The closing body 40a is supported in the retainer 40b so that it can pivot by a particular angle. The spring 40d makes sure that the closing body 40a is held in the retainer 40b with a determinable, slight friction.

The membrane 42 divides an upper inner chamber 48 from a lower inner chamber 50 inside the valve housing 8. The lower inner chamber 50 contains fuel and communicates with the inflow 26. The upper inner chamber 48 contains air and communicates via an air connection 48a with an intake tube of the internal combustion engine, which tube is not shown.

The stress of the regulating spring 44 determines the supply pressure of the fuel in the inflow 26. In addition, the supply pressure is determined by the low pressure in the intake tube of the internal combustion engine, which tube is not shown and which communicates with the pressure regulating valve 6 via the air connection 48a. If the supply pressure in the inflow 26 is higher than intended, then the closing face 46 on the valve member 40 lifts off from the valve seat 10h provided on the connecting fitting 10. As a result, excess fuel from the inflow 26 can drain into the return 28 by means of the longitudinal bore 22. The closing face 46 provided on the valve member 40, together with the ball-shaped closing body 40a inside the retainer 40b, can be pivoted or inclined so far that even when the connecting fitting 10 is maximally pivoted around the pivot bearing 34, the closing face 46 can perfectly seal the valve seat 10h. The diameter of the closing face 46 is dimensioned so that even with a maximally pivoted connecting fitting 10, the valve seat 10h is perfectly overlapped.

The connecting fitting 10 can be divided into various regions, the fitting end 10a with the entry bevel 20a formed onto it, an outer shoulder 10b, a groove recess 10c, an inner shoulder 10d, a radially projecting step 10e, a cylindrical region 10f, a region with a ball zone 10g and a region with the valve seat 10h. The ball zone 10g is the region of the connecting fitting 10 which is shaped like a ball; however, the ball shape, toward the bottom with regard to FIG. 2, transitions into the cylindrical region 10f, and toward the top, adjoins the region with the valve seat 10h.

Figure 3:
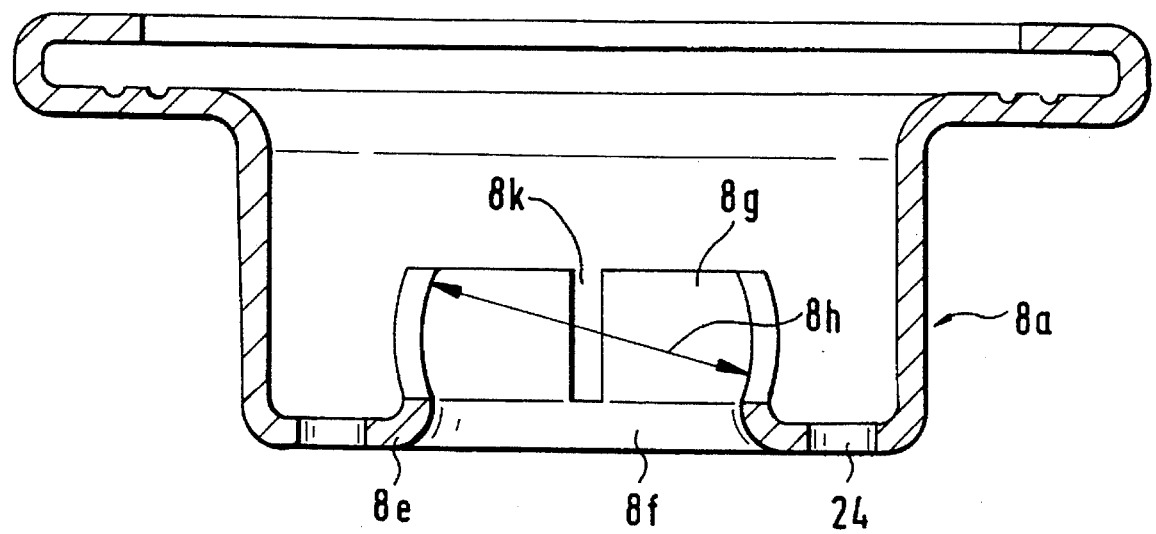
FIGS. 3 and 4 show a selected detail of the pressure regulating device, which detail is embodied for example in a different manner.

For purposes of a better overall view, in FIG. 3, the first part 8a of the valve housing 8 is shown again separately, with a different scale. As shown in FIG. 3, the first part 8a has an approximately cup-like shape. The inflow opening 24 or a plurality of inflow openings 24 are disposed in a bottom region 8e of the part 8a. A central part of the bottom region 8e is bent inward so that an opening 8f is produced here. The part 8a of the valve housing 8 is formed in the center of the bottom region 8e so that a ring is produced around the opening 8f; the ring has a shape which can be described as a ball socket 8g. Toward the inside, the ball socket 8g has a shape which is adapted in shape and size to the ball zone 10g of the connecting fitting 10. The ball socket 8g has an inner ball diameter 8h. Before the connecting fitting 10 is installed, the ball diameter 8h of the ball socket 8g is a little smaller than the ball diameter of the ball zone 10g of the connecting fitting 10 so that in the installed state, the ball zone 10g of the connecting fitting 10 is secured inside the ball socket 8g of the valve housing 8 with initial stress. As a result of the shape of the ball socket 8g, which is described and can be seen in the drawing, the firm securing of the connecting fitting 10 by the ball socket 8g is achieved. In the longitudinal direction, a slot 8k is provided in the ball socket 8g. A plurality of slots 8k can be provided, for example four. The slots 8k are used so that upon insertion of the ball zone 10g of the connecting fitting 10 into the ball socket 8g of the valve housing 8, the ball socket 8g can elastically widen in the radial direction and thus the installation is possible in a trouble-free manner.

The pivot bearing 34, whose center point is disposed approximately in the center of the ball zone 10g, is constituted in the interplay between the ball socket 8g of the valve housing 8 and the ball zone 10g of the connecting fitting 10, which zone is secured in the ball socket 8g. This center point is normally the intersection point of the pivot angle α.

The fourth part 8d (FIG. 2) of the valve housing 8 is likewise embodied as cup-shaped and has an opening in the center of its bottom region, through which opening the connecting fitting 10 extends. The part 8d has an elastic retaining lip 8m running around this opening. In the assembled state, the retaining lip 8m is supported on the step 10e provided on the connecting fitting 10. The assembled parts are dimensioned so that the connecting fitting 10 presses the fourth part 8d against the first part 8a of the valve housing 8. A sieve is installed between the parts 8a and 8d. The sieve is disposed lateral to the inflow opening 24 and can also be a component of the part 8d.

The cup-shaped fourth part 8d has a circumferential edge, which projects in the axial direction and is adapted to the first part 8a so that the two parts 8a and 8d of the valve housing 8 are centered in relation to one another. The circumferential retaining lip 8m on the fourth part 8d of the valve housing 8 is elastic in the radial direction to the extent that a pivoting motion of the connecting fitting 10 around the pivot bearing 34, which motion is required when installing the valve housing 8 on the fuel housing 4, is not essentially hindered by the retaining lip 8m. On the other hand, the retaining lip 8m is rigid to the extent that before installation of the pressure regulating valve 6 on the fuel housing 4, the connecting fitting 10 is secured approximately flush to the longitudinal housing axis 36 by the retaining lip 8m. This makes the installation of the pressure regulating valve 6 on the fuel housing 4 essentially easier. The retaining lip 8m constitutes a simple, favorably functioning, and therefore preferred centering aid 52 for aligning the connecting fitting 10 in relation to the valve housing 8. The centering aid 52 can also be embodied in another manner, for example by means of an additional spring element, which is supported on one end against the valve housing 8 and on the other, against the connecting fitting 10.

The part 8c of the valve housing 8 retained by the part 8d is dimensioned with its outer diameter so that the valve housing 8 is secured in the radial direction against the stop position 30 without radial play of any consequence. The outer diameter of the fourth part 8d is preferably a little smaller than the outer diameter of the third part 8c of the valve housing 8. A seal 54, which seals the fuel housing 4 toward the outside, is provided between the parts 8c and 8d. A seal 56 is provided in the groove recess 10c for the purpose of sealing the inflow 26 in relation to the return 28. To protect the seal 56, the outer diameter of the outer shoulder 10b is only slightly smaller than the inner diameter of the connecting end 18a of the connecting piece 18. To assure that the pivoting of the connecting piece 10 around the pivot bearing 34 is not hindered, the outer diameter of the inner shoulder 10d is dimensioned distinctly smaller than the inner diameter of the connecting end 18a of the connecting piece 18. Consequently, the outer diameter of the inner shoulder 10d is preferably distinctly smaller than the outer diameter of the outer shoulder 10b of the connecting fitting 10.

In the exemplary embodiment shown (FIG. 2), the insertion aid 20 is constituted by the entry bevel 20a on the fitting end 10a of the connecting fitting 10 and by an entry bevel 20b on the connecting end 18a of the connecting piece 18. The insertion aid 20 can also be achieved in other ways. For example, only the entry bevel 20a or the entry bevel 20b can be provided.

Since the lower inner chamber 50 communicates with the inflow 26 via the inflow opening 24, the pressure in the lower inner chamber 50 is virtually identical to the pressure in the inflow 26 so that no seal is necessary between the lower inner chamber 50 and the inflow 26. In particular, no seal is required, either between the ball zone 10g of the connecting fitting 10 and the ball socket 8g of the valve housing 8 or between the retaining lip 8m and the connecting fitting 10.

Figure 4:
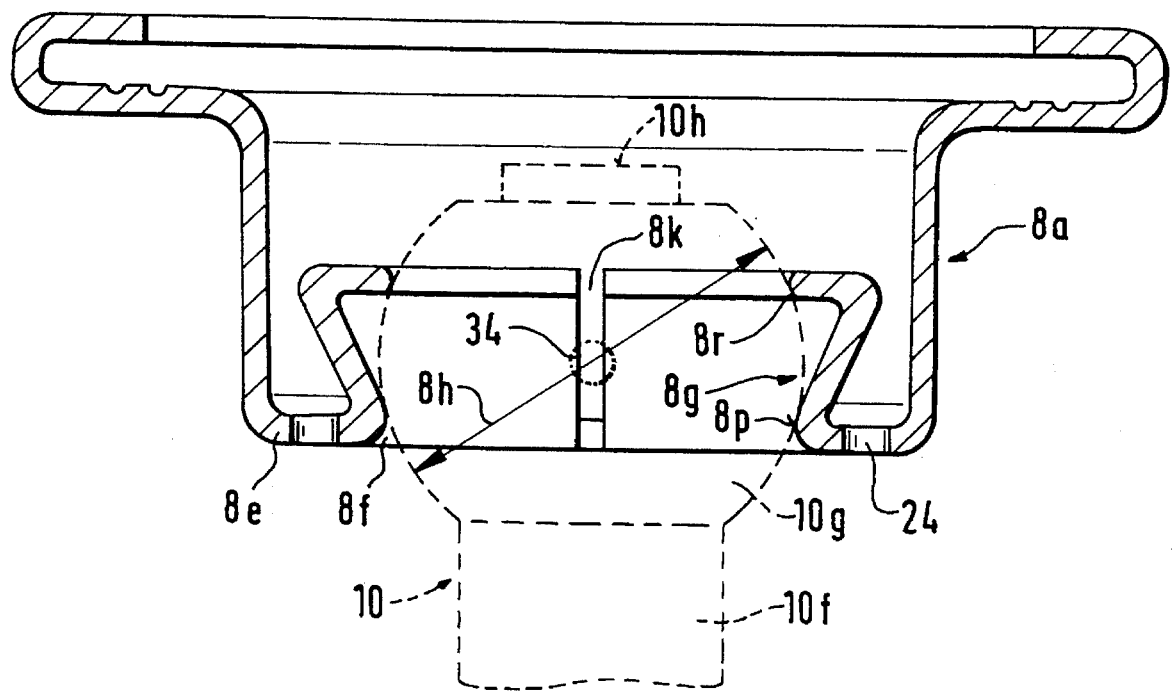

FIG. 4 shows another exemplary embodiment by way of example. FIG. 4 shows the same detail as FIG. 3, but in a modified form.

In the exemplary embodiment shown in FIG. 3, the ball socket 8g has a shape which corresponds to a part of a ball.

In other words, viewed in geometrical terms, the ball socket 8g can likewise be described as a ball zone. Aside from this preferred embodiment of the ball socket 8g, there are still other options for how the ball socket 8g can be embodied. FIG. 4 shows another preferred exemplary embodiment.

Like FIG. 3, FIG. 4 shows the first part 8a of the valve housing 8, before this part 8a is assembled with the other parts. For better illustration in FIG. 4, the connecting fitting 10 is additionally indicated with dashed lines, and in addition, the center point for pivoting the connecting fitting 10, that is the pivot bearing 34, is drawn in.

In the exemplary embodiment shown in FIG. 4, the ball socket 8g touches the ball zone 10g at a lower guide circle 8p and an upper guide circle 8r. The guide circles 8p and 8r run in the circumference direction around the ball zone 10g of the connecting fitting 10. In the exemplary embodiment, the guide circles 8p and 8r are only broken by the slots 8k. The ball socket 8g of the valve housing 8 can also be embodied so that the ball socket 8g only touches the ball zone 10g of the connecting fitting 10 at individual points, for example at three points each. The diameter of the guide circles 8p and 8r on the valve housing 8 are dimensioned so that when the connecting fitting 10 is installed, an elastic initial stress exists between the ball zone 10g and the ball socket 8g. Because of this initial stress, the lower guide circle 8p can ensure that the connecting fitting 10 does not slip out at the bottom, and the upper guide circle ensures that the connecting fitting 10 does not expand at the top. With the aid of the ball socket 8g, which in the exemplary embodiment shown in FIG. 4 touches the ball zone 10g of the connecting fitting 10 along the guide circles 8p and 8r, it is assured that the connecting fitting 10 is perfectly secured in the longitudinal direction in the valve housing 8 and at the same time, the ball socket 8g makes it possible that the pivot bearing 34 is produced around which the connecting fitting 10 is supported so that it can pivot to a sufficient extent. This pivot bearing 34 makes the deflection E (FIG. 1) possible and thereby permits an adaptation to as large as possible a lateral offset to be compensated for between the connecting piece 18 and the stop position 30.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A pressure regulating device which comprises a pressure regulating valve (6), which is connected to a fuel-carrying fuel housing (4) of a fuel supply of an internal combustion engine, which pressure regulating device has a valve housing and a connecting fitting, which exchanges fuel with the fuel housing, wherein the valve housing of the pressure regulating valve is stopped at a stop position provided on the fuel housing and the connecting fitting is connected to a connecting piece connected to the fuel housing, the pressure regulating valve (6) is provided with a pivot bearing (34), with which the connecting fitting (10) is pivotably supported in relation to the valve housing (8).

2. The pressure regulating device according to claim 1, in which the connecting fitting (10) is supported so that it pivots spatially in a plurality of planes in relation to the valve housing (8).

3. The pressure regulating device according to claim 1, in which to form the pivot bearing (34), a ball zone (10g) is embodied on the connecting fitting (10) and a ball socket (8g), which receives the ball zone (10g), is embodied on the valve housing (8).

4. The pressure regulating device according to claim 2, in which to form the pivot bearing (34), a ball zone (10g) is embodied on the connecting fitting (10) and a ball socket (8g), which receives the ball zone (10g), is embodied on the valve housing (8).

5. The pressure regulating device according to claim 3, in which the ball socket (8g) receives the ball zone (10g) with an initial stress.

6. The pressure regulating device according to claim 4, in which the ball socket (8g) receives the ball zone (10g) with an initial stress.

7. The pressure regulating device according to claim 3, in which a deep-drawn sheet metal part (8a) is provided, said sheet metal part constitutes at least one part of the valve housing (8) and the ball socket (8g).

8. The pressure regulating device according to claim 5, in which a deep-drawn sheet metal part (8a) is provided, said sheet metal part constitutes at least one part of the valve housing (8) and the ball socket (8g).

9. The pressure regulating device according to claim 1, in which the connecting fitting (10) has a fitting end (10a) oriented toward the fuel housing (4) and the connecting piece (18) has a connecting end (18a) oriented toward the connecting fitting (10), and that an insertion aid (20, 20a, 20b) is provided on the fitting end (10a) and/or on the connecting end (18a).

10. The pressure regulating device according to claim 2, in which the connecting fitting (10) has a fitting end (10a) oriented toward the fuel housing (4) and the connecting piece (18) has a connecting end (18a) oriented toward the connecting fitting (10), and that an insertion aid (20, 20a, 20b) is provided on the fitting end (10a) and/or on the connecting end (18a).

11. The pressure regulating device according to claim 3, in which the connecting fitting (10) has a fitting end (10a) oriented toward the fuel housing (4) and the connecting piece (18) has a connecting end (18a) oriented toward the connecting fitting (10), and that an insertion aid (20, 20a, 20b) is provided on the fitting end (10a) and/or on the connecting end (18a).

12. The pressure regulating device according to claim 5, in which the connecting fitting (10) has a fitting end (10a) oriented toward the fuel housing (4) and the connecting piece (18) has a connecting end (18a) oriented toward the connecting fitting (10), and that an insertion aid (20, 20a, 20b) is provided on the fitting end (10a) and/or on the connecting end (18a).

13. The pressure regulating device according to claim 7, in which the connecting fitting (10) has a fitting end (10a) oriented toward the fuel housing (4) and the connecting piece (18) has a connecting end (18a) oriented toward the connecting fitting (10), and that an insertion aid (20, 20a, 20b) is provided on the fitting end (10a) and/or on the connecting end (18a).

14. The pressure regulating device according to claim 1, in which a seal is provided which seals an inner chamber (28) of the connecting fitting (10) and the conecting piece (18).

15. The pressure regulating device according to claim 2, in which a seal is provided which seals an inner chamber (28) of the connecting fitting (10) and the connecting piece (18).

16. The pressure regulating device according to claim 3, in which a seal is provided which seals an inner chamber (28) of the connecting fitting (10) and the connecting piece (18).

17. The pressure regulating device according to claim 5, in which a seal is provided which seals an inner chamber (28) of the connecting fitting (10) and the connecting piece (18).

18. The pressure regulating device according to claim 7, in which a seal is provided which seals an inner chamber (28) of the connecting fitting (10) and the connecting piece (18).

19. The pressure regulating device according to claim 9, in which a seal is provided which seals an inner chamber (28) of the connecting fitting (10) and the connecting piece (18).

20. The pressure regulating device according to claim 1, in which an inner chamber (28) constituted by the connecting fitting (10) and the connecting piece (18) is used as a fuel return (28).

21. The pressure regulating device according to claim 2, in which an inner chamber (28) constituted by the connecting fitting (10) and the connecting piece (18) is used as a fuel return (28).

22. The pressure regulating device according to claim 3, in which an inner chamber (28) constituted by the connecting fitting (10) and the connecting piece (18) is used as a fuel return (28).

23. The pressure regulating device according to claim 5, in which an inner chamber (28) constituted by the connecting fitting (10) and the connecting piece (18) is used as a fuel return (28).

24. The pressure regulating device according to claim 7, in which an inner chamber (28) constituted by the connecting fitting (10) and the connecting piece (18) is used as a fuel return (28).

25. The pressure regulating device according to claim 9, in which an inner chamber (28) constituted by the connecting fitting (10) and the connecting piece (18) is used as a fuel return (28).

26. The pressure regulating device according to claim 14, in which an inner chamber (28) constituted by the connecting fitting (10) and the connecting piece (18) is used as a fuel return (28).

27. The pressure regulating device according to claim 1, in which a centering aid (52) is provided which aligns the connecting fitting (10) in relation to the valve housing (8).

28. The pressure regulating device according to claim 2, in which a centering aid (52) is provided which aligns the connecting fitting (10) in relation to the valve housing (8).

29. The pressure regulating device according to claim 3, in which a centering aid (52) is provided which aligns the connecting fitting (10) in relation to the valve housing (8).

30. The pressure regulating device according to claim 5, in which a centering aid (52) is provided which aligns the connecting fitting (10) in relation to the valve housing (8).

* * * * *